Figure 1:
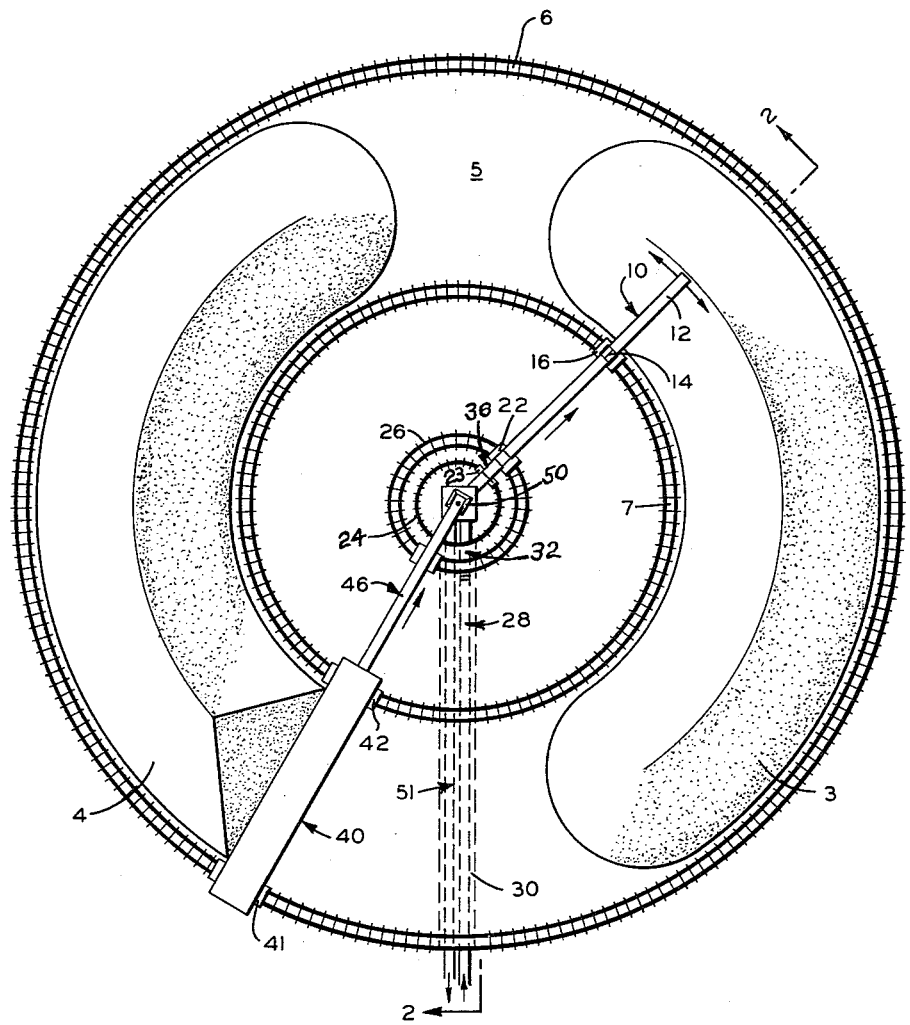

Aug. 14, 1962    W. P. HANSEN    3,049,244
STACKING AND RECLAIMING MATERIAL
Filed Aug. 25, 1958    2 Sheets-Sheet 1

INVENTOR.
WALTER P. HANSEN
BY

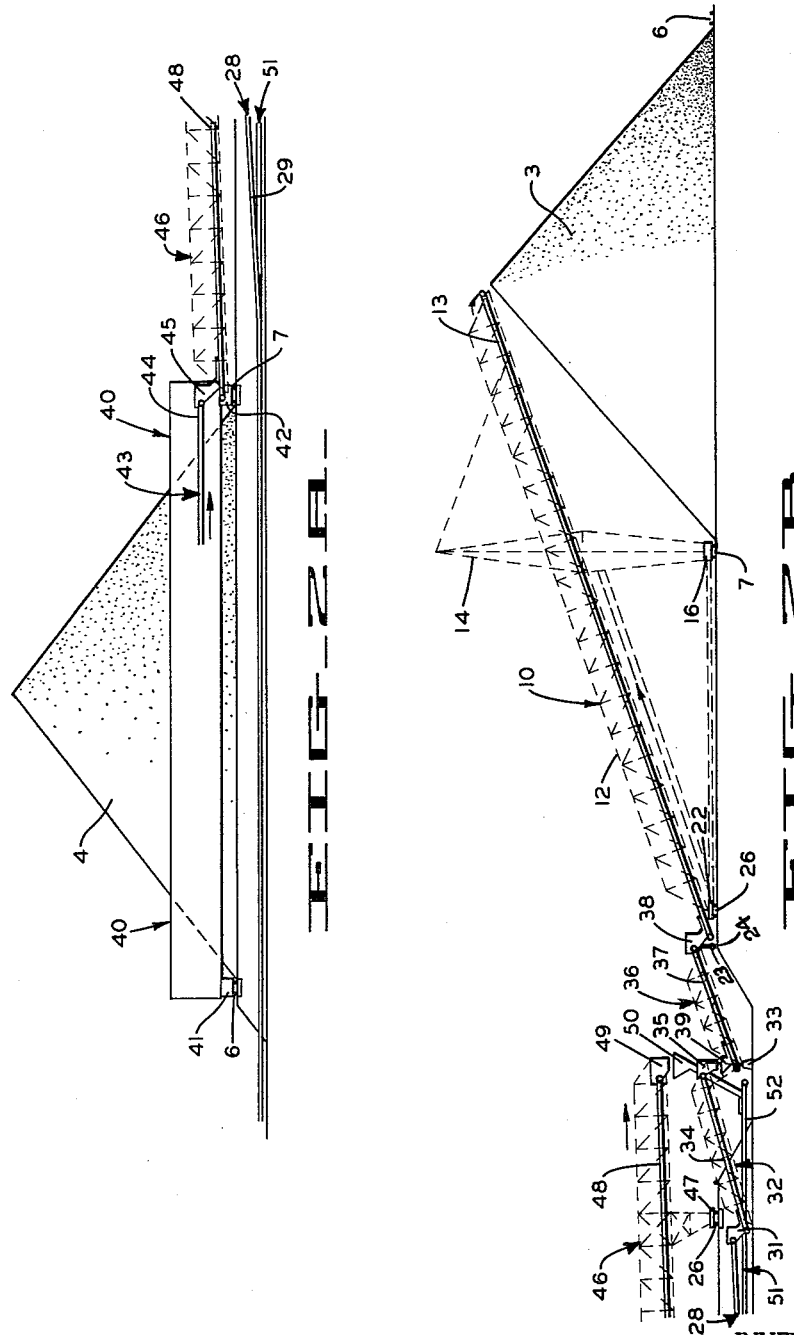

United States Patent Office 3,049,244
Patented Aug. 14, 1962

3,049,244
STACKING AND RECLAIMING MATERIAL
Walter P. Hansen, San Leandro, Calif., assignor to Henry J. Kaiser Company, Oakland, Calif., a corporation of Nevada
Filed Aug. 25, 1958, Ser. No. 756,873
2 Claims. (Cl. 214—10)

This invention relates in general to the handling of materials. More specifically, the invention relates to a method and apparatus for the stacking and reclaiming of materials, said method and apparatus having particular relation to the blending of crushed or comminuted material, such as ore.

The stacking of materials, e.g. ore, and the later reclaiming of it has been practiced in industrial operations for many years for stock piling purposes and also for the purpose of blending the materials in order to reduce size and composition variations of the material as it is reclaimed. In the blending of ore, the crushed or comminuted ore is deposited in a pile or bed composed of several hundred layers of ore. Later the ore is reclaimed by removing successive cross-sections of said bed, whereby the numerous layers of the bed are intermixed to produce a blend of the ore which is substantially uniform in size and/or chemical content characteristics.

In the usual blending procedure, the ore is stacked in long, straight, narrow piles, said piles being in parallel relationship. Typical equipment used for stacking the ore is a stacker traveling on tracks adjacent and parallel to the pile being placed, said stacker comprised of a belt tripper device and a boom conveyor to the top of the pile. A supply conveyor system provides the ore to be blended to the stacker and is comprised of a tripper conveyor positioned at the side of and running the length of the stockpile and suitable conveyors to feed the ore to the tripper conveyor.

In reclaiming ore from the stockpile, a suitable reclaiming machine, which removes the ore from an end face of a stockpile, is employed. The reclaiming machine or reclaimer may be comprised of a rake and a scraper conveyor, a rake and trencher-type digging wheels, a common dragline or other suitable equipment known to those skilled in the art. The reclaimer travels on tracks which are parallel and adjacent the stockpile and deposits the reclaimed ore onto a suitable reclaim conveyor system which provides a conveyor the length of and adjacent the stockpile. Suitable cross conveyors are necessary to collect ore from the reclaim conveyors of various stockpiles for delivery at a single point or station.

In the blending and reclaiming operations, when one stockpile is reclaimed, it is necessary to transport the reclaiming equipment to another stockpile and set of tracks. To accomplish this, suitable transfer equipment such as a transfer car with the necessary tracks and drive equipment running across the ends of the stockpiles is used. Necessarily, the reclaiming operation must be stopped during the time that equipment is being transferred. Also, if more than two stockpiles are employed in the operations, the stacker must also be transferred. These problems which hinder the efficiency of the stacking and reclaiming operations can be solved by duplication of equipment at each stockpile. However, this is an expensive solution. Also, another disadvantage of the present stacking and reclaiming systems is that the ground area required is relatively large. Too, if the stacking and reclaiming equipment are electrically powered, numerous and widely scattered collector rails for power supply to stackers and reclaimers must be employed. This not only involves considerable expense but also is a potential hazard.

Therefore, it is a primary object of this invention to provide a method and system for stacking and/or reclaiming material which will overcome the disadvantages of prior art stacking and reclaiming operations.

It is a further object of this invention to provide a method for stacking and/or reclaiming material wherein material is stacked and reclaimed in a common circular path with the material for stacking and the reclaimed material being handled through a central distribution and receiving point located at the center of said circular path.

It is also an object of this invention to provide a stacking and reclaiming system wherein stacking equipment and reclaiming equipment are positioned on a common circular path, said system having distribution and receiving means located at the center of said circular path for distributing or supplying material to the stacking equipment and receiving material from the reclaiming equipment.

It is a further object of this invention to provide a stacking and reclaiming system which requires substantially less ground space and less overall cost of equipment and supporting structures than presently used systems.

It is a still further object of this invention to provide a method and system for stacking and/or reclaiming material which substantially reduces down time and eliminates the need for special transfer equipment, and additional sets of tracks for moving the stacking and/or reclaiming equipment from one pile of material to another.

It is also an object of this invention to provide a system for stacking and reclaiming material wherein the conveying equipment for supplying material to stacking equipment and receiving material from reclaiming equipment is substantially reduced when compared to presently used systems.

It is an additional object of this invention to provide a system for stacking and reclaiming materials wherein the electrical power distribution equipment is substantially reduced and simplified over prior art systems thereby resulting in substantial savings in capital cost and in increased safety to workers.

These and other objects and advantages of this invention will become more apparent from the ensuing description of the invention.

Broadly, the instant method for stacking material, e.g. crushed ore, comprises the steps of transporting said material from a given point to an area of stacking, and stacking said material in a pile, said pile extending along a circular path, the center of which is said given point. The method of reclaiming of the material comprises the steps of reclaiming said material from an end face of said pile and delivering the reclaimed material to said given point. The material may be stacked in a pile which extends substantially 360° around said circular path, or it may be stacked in multiple piles around said circular path. Also included is the stacking of the material in a pile which extends less than 180° around said circular path whereby material can be stacked in a second pile diametrically positioned to the first pile on the circular path. The stacking of said second pile may be conducted simultaneously with or independently of the reclaiming of the material of the first pile.

When the invention is practiced in the blending of material, such as crushed or comminuted ore, the method includes the steps of stacking of the material in a plurality of layers and reclaiming of the material by removing successive cross sections of said pile starting with an end face thereof.

The system of the instant invention, which may be utilized in practice of the disclosed method of stacking and reclaiming material, broadly comprises in combination means for stacking said material in a pile extending along a circular path, means for reclaiming said material from said pile, said stacking means and said reclaiming means adapted to revolve about a common point, and distribution and receiving means located at said common point for supplying material to the stacking means and receiving material from the reclaiming means. Suitable means, such as belt conveyors, are provided for handling the material supplied to and received from said distribution and receiving means. Also, suitable means are employed for moving the stacking means and reclaiming means along the circular path. For example, the stacking means and reclaiming means may be adapted to move on tracks comprised of one or more rails positioned concentric with said circular path.

This invention is further described with reference to the accompanying drawings wherein is illustrated a specific embodiment of a system for practice of the invention but which is not intended to limit the scope of the invention defined in the appended claims.

In the drawings:

FIGURE 1 is a plan view of a stacking and reclaiming system embodying the principles of the invention.

FIGURE 2, comprising FIGURES 2A and 2B, is an elevation view of the system depicted in FIGURE 1 taken along the line 2—2 of FIGURE 1.

In the figures there are shown curved and elongated piles 3 and 4 of material, e.g., crushed or comminuted ore. Pile 3, which is shown as being stacked, extends almost 180° along a circular path 5, which is defined by concentric circular tracks 6 and 7. Pile 4, which is shown in the figures as being reclaimed, also extends along path 5 for almost 180° and is diametrically positioned to pile 3.

A stacker 10, which pivots about the center of the circular path 5, deposits material on pile 3. Radial stacker 10 is comprised of a supply conveyor 12 and a boom 14 which functions to elevate conveyor 12 to a sufficient height to permit the continuous belt 13 of conveyor 12 to discharge the material onto the top of pile 3. Boom 14 is mounted on trucks 16 and 22 which run on circular tracks 7 and 26, respectively. One extremity of conveyor 12 is mounted on truck 22 which runs on circular track 26. As depicted in FIGURE 1, circular tracks 6, 7 and 26 are concentric and have a common center with circular path 5.

During the stacking operation, radial stacker 10 moves along tracks 6 and 26 and deposits the material in an arcuate path thereby forming curved elongated pile 3. If the material, such as crushed or comminuted ore, is to be blended, the radial stacker 10 moves back and forth along tracks 6 and 26 during the stacking operation thereby depositing the material in layers.

The material is supplied to stacker 10 by a series of conveyors. A supply conveyor 28 is shown in the figures as disposed in a tunnel 30 which underlies path 5 between adjacent ends of piles 3 and 4. However, it is not necessary that a tunnel be employed in this system in accomplishing the objects of the invention. For example, entry of the material may be through a depressed area or ditch. In that event, small bridges would be provided for tracks 6, 7 and 26. Conveyor 28 receives the material such as crushed ore from a crushing plant (not shown) and conveys it by endless belt 29 and a chute 31 to a conveyor 32. Conveyor 32 is supported by any suitable means (not shown) so that its head chute 35 is directly above center support 33 which is located at the center of circular path 5. Conveyor 32 conveys the material by endless belt 34 and head chute 35, into chute 39 which is mounted on conveyor 36. One extremity of conveyor 36 is suitably mounted on center support 33 so that it may rotate about support 33. Conveyor 36 is also mounted on truck 23 which travels on circular track 24, track 24 being concentric with tracks 6, 7 and 26. The other extremity of conveyor 36 is joined to conveyor 12 by any suitable connection or coupling which will allow conveyors 12 and 36 to be disconnected, as will be hereafter described. Conveyor 36 transports the material on endless belt 37 and deposits it onto belt 13 by means of chute 38.

Reclaiming machine 40 is mounted on trucks 41 and 42 which run on tracks 6 and 7, respectively, and can remove material progressively from an end face of pile 4, as shown in FIGURES 1 and 2. Machine 40 may be of any suitable type known in the art, such as a rake and scraper conveyor or a rake and trencher type digging wheels. The materials reclaimed by machine 40 is transported on a conveyor 43 which is mounted on machine 40. Conveyor 43 conveys the material by means of endless belt 44 and chute 45 onto a bridge conveyor 46. Conveyor 46 has one extremity mounted on truck 42 while its other extremity is located at the center of the circular path 5. Between its extremities conveyor 46 is mounted on truck 47 which runs on circular track 26. Conveyor 46 thus pivots about the center of the circular path as reclaiming machine 40 moves progressively along pile 4.

The material is conveyed by conveyor 46 by means of endless belt 48 and chute 49 into a hopper 50 which is located at the center of circular path 5. The hopper 50 delivers the material to conveyor 51 which is suitably mounted in tunnel 30 as shown in FIGURE 1. The conveyor 51 transports the material by means of endless belt 52 out of the area of stacking and reclaiming. Conveyor 51 need not be located in tunnel 30 which also houses supply conveyor 28. Conveyor 51 may be located in a separate tunnel which may underlie path 5 at any point.

When specifically applied to blending, the stacking and reclaiming system described above and shown in FIGURES 1 and 2 requires only two stockpiles, one being stacked or placed and the other reclaimed. The material to the stacker 10 is from a central distribution point (the center of circular path 5) and reclaimed material is delivered to the same point. While the stacker 10 is traveling back and forth in an arcuate path laying down multiple layers of the material onto pile 3, the reclaimer 40 is gathering material from pile 4.

With reference to FIGURE 1, when pile 4 is completely reclaimed, reclaimer 40 need only move forward a short distance on tracks 6 and 7 to be in position to reclaim the material in pile 3. At that time the stacker 10 can then be uncoupled from conveyor 36 and moved in the same direction as reclaimer 40 on tracks 7 and 26 in order to be in position to stack material in the area just reclaimed. In the specific embodiment shown in the figures it is necessary to uncouple stacker 10 from conveyor 36 because conveyor 32 and the chute from hopper 50 will not permit a full 360° rotation of conveyor 36. After uncoupling from stacker 10, conveyor 36 can be rotated in the opposite direction to that of stacker 10 almost a complete revolution and recoupled to stacker 10. Thus, the moving of stacker 10 and reclaiming machine 40 to new piles does not require substantial down time or special transfer equipment or new sets of tracks.

The stacker 10 and reclaiming machine 40 and the endless belts of the various conveyors can be powered by any suitable means, such as electric motors, not shown. A simplified electrical distribution system can be employed wherein all electric cables are distributed from the center of circular path 5. This eliminates the necessity for collector rails, and gives not only a large savings in capital expense but also eliminates a potential safety hazard.

The foregoing detailed description illustrates a specific embodiment of a stacking and reclaiming system which may be used in practice of the invention. However, specific details, steps, etc., set forth are not intended to be limiting on the scope of the invention. It will be obvious that the invention may be carried out with various modifications. For example, the stacking and reclaiming operations do not have to be carried out simultaneously as described in the detailed discussion. The stacker 10 may be in operation while the reclaimer 40 is idle and vice versa. Although the invention is not limited to track mounted equipment, circular tracks 6, 7, 24 and 26 are shown and described as illustrative of the specific embodiment. There could be more or less tracks than shown in the figures depending upon the design of equipment for a specific installation. Supply conveyor 28 could be suitably extended to convey the material to the center of circular path 5, thereby eliminating the necessity for conveyor 32. Also, the equipment such as a stacker, reclaimer and necessary conveyors could be suitably mounted on overhead or roof structures.

Further, the interference with the making of a complete revolution by conveyor 36 may be eliminated. A vertical bucket type conveyor or other means may be used instead of inclined belt conveyor and a vertical chute could be supplied hopper 50 instead of the inclined chute shown in FIGURE 2. The bucket conveyor and chute would be located at the central distribution and receiving point and by a simple suitable arrangement conveyor 36 could revolve 360° around the bucket conveyor and chute. Also, by this arrangement conveyor 36 could be eliminated and by suitable arrangement conveyor 12 of stacker 10 could be extended to the distribution and receiving point. In addition, with this arrangement it would not be necessary for tunnel 30 to underlie path 5 between adjacent ends of piles 3 and 4. The tunnel or tunnels housing the supply conveyors and return conveyors could underlie path 5 in any location. These and other modifications may be made by those skilled in the art without departing from the scope of the invention as defined in the appended claims.

What is claimed is:

1. An apparatus for stacking and reclaiming material comprising a plurality of material-conveying structures extending radially from a common point, one of said material-conveying structures including means for stacking material along a curved elongated circular path, another of said material-conveying structures including means for reclaiming previously stacked material, said radially extending, material-conveying structures being adapted to operate and revolve independently about said common point, additional radially extending, material-conveying structures for supplying material to and withdrawing material from said common point, said last mentioned means for supplying and withdrawing material being independent of said material-conveying structures for stacking and reclaiming, all of said radially extending structures converging at said common point, and means associated with said radially extending structures to enable the simultaneous supplying, stacking, reclaiming, and withdrawing of material.

2. An apparatus for stacking and reclaiming according to claim 1 wherein a plurality of circular, concentric tracks surround said common point and said material-conveying structures for stacking and reclaiming are mounted on said tracks.

References Cited in the file of this patent

UNITED STATES PATENTS

| | | |
|---|---|---|
| 446,814 | Dodge | Feb. 17, 1891 |
| 501,770 | Dodge | July 18, 1893 |
| 502,555 | Dodge | Aug. 1, 1893 |
| 537,680 | Dodge | Apr. 16, 1895 |
| 722,515 | Johnston | Mar. 10, 1903 |
| 782,694 | Piez | Feb. 14, 1905 |
| 860,365 | Fry | July 16, 1907 |
| 891,124 | Williams | June 16, 1908 |
| 897,893 | Hamilton | Sept. 8, 1908 |
| 1,346,990 | Stuart | July 20, 1920 |